US010832012B2

(12) United States Patent
Nomura et al.

(10) Patent No.: US 10,832,012 B2
(45) Date of Patent: Nov. 10, 2020

(54) METHOD EXECUTED IN TRANSLATION SYSTEM AND INCLUDING GENERATION OF TRANSLATED TEXT AND GENERATION OF PARALLEL TRANSLATION DATA

(71) Applicant: Panasonic Intellectual Property Corporation of America, Torrance, CA (US)

(72) Inventors: Kazuya Nomura, Osaka (JP); Tsuyoki Nishikawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 161 days.

(21) Appl. No.: 16/013,508

(22) Filed: Jun. 20, 2018

(65) Prior Publication Data
US 2019/0018842 A1 Jan. 17, 2019

(30) Foreign Application Priority Data
Jul. 14, 2017 (JP) ................................. 2017-137828

(51) Int. Cl.
*G06F 40/58* (2020.01)
*G06F 40/30* (2020.01)
*G06F 40/51* (2020.01)

(52) U.S. Cl.
CPC .............. *G06F 40/58* (2020.01); *G06F 40/30* (2020.01); *G06F 40/51* (2020.01)

(58) Field of Classification Search
None
See application file for complete search history.

(56) References Cited

U.S. PATENT DOCUMENTS 6,385,568 B1 * 5/2002 Brandon ............... G06F 17/271
704/2
7,539,619 B1 * 5/2009 Seligman ............ G06F 17/2755
704/2
(Continued)

FOREIGN PATENT DOCUMENTS

JP        2004-156806       6/2004

OTHER PUBLICATIONS

Papineni, Kishore, et al. "BLEU: a method for automatic evaluation of machine translation." Proceedings of the 40th annual meeting on association for computational linguistics. Association for Computational Linguistics, 2002. (Year: 2002).*
(Continued)

*Primary Examiner* — Douglas Godbold
(74) *Attorney, Agent, or Firm* — Greenblum & Bernstein, P.L.C.

(57) ABSTRACT

A method executed in a translation system includes: (A) receiving source text in a first language; (B) translating the source text into a second language to generate first translated text; (C) acquiring a determination result as to whether or not the first translated text has been correctly translated; (D) in a case where the first translated text has not been correctly translated, generating first parallel translation data that includes the source text and the first translated text; (E) transmitting the first parallel translation data to a terminal device; (F) receiving, from the terminal device, second translated text obtained by the source text being correctly translated into the second language; and (G) registering, into a parallel translation database, second parallel translation data that includes the source text and the second translated text.

9 Claims, 13 Drawing Sheets

(56) References Cited

U.S. PATENT DOCUMENTS

| | | | | |
|---|---|---|---|---|
| 10,248,651 B1* | 4/2019 | Fuerstenau | ......... | G06F 17/2854 |
| 2004/0260532 A1* | 12/2004 | Richardson | ......... | G06F 17/2836 |
| | | | | 704/2 |
| 2007/0271088 A1* | 11/2007 | Waibel | ................... | G06F 17/275 |
| | | | | 704/9 |
| 2008/0103759 A1* | 5/2008 | Dolan | ..................... | G06F 17/24 |
| | | | | 704/8 |
| 2009/0326913 A1* | 12/2009 | Simard | ............... | G06F 17/2836 |
| | | | | 704/2 |
| 2011/0022381 A1* | 1/2011 | Gao | .................... | G06F 17/2818 |
| | | | | 704/7 |
| 2011/0246173 A1* | 10/2011 | Li | ....................... | G06F 17/2827 |
| | | | | 704/2 |
| 2011/0307241 A1* | 12/2011 | Waibel | .................. | G10L 15/265 |
| | | | | 704/2 |
| 2012/0284013 A1* | 11/2012 | Chin | ..................... | G06F 3/0481 |
| | | | | 704/2 |
| 2013/0054224 A1* | 2/2013 | Jiang | .................. | G06F 17/2818 |
| | | | | 704/2 |
| 2013/0110493 A1* | 5/2013 | Kim | .................... | G06F 17/2818 |
| | | | | 704/2 |
| 2014/0149102 A1* | 5/2014 | Marcu | ................. | G06F 17/2827 |
| | | | | 704/2 |
| 2015/0106076 A1* | 4/2015 | Hieber | ................ | G06F 17/2854 |
| | | | | 704/2 |
| 2016/0140111 A1* | 5/2016 | Mirkin | .................. | G06F 17/289 |
| | | | | 704/2 |
| 2016/0350290 A1* | 12/2016 | Fujiwara | ............. | G06F 17/2854 |
| 2017/0220561 A1* | 8/2017 | Fujiwara | ............. | G06F 17/2827 |
| 2017/0371866 A1* | 12/2017 | Eck | ..................... | G06F 17/2818 |
| 2018/0357224 A1* | 12/2018 | Yamauchi | .......... | G06F 17/2854 |

OTHER PUBLICATIONS

Resnik, Philip, et al. "Using targeted paraphrasing and monolingual crowdsourcing to improve translation." ACM Transactions on Intelligent Systems and Technology (TIST) 4.3 (2013): 38. (Year: 2013).*

Callison-Burch, Chris, Philipp Koehn, and Miles Osborne. "Improved statistical machine translation using paraphrases." Proceedings of the main conference on Human Language Technology Conference of the North American Chapter of the Association of Computational Linguistics. 2006 (Year: 2006).*

Marton, Yuval. "Distributional phrasal paraphrase generation for statistical machine translation." ACM Transactions on Intelligent Systems and Technology (TIST) 4.3 (2013): 39. (Year: 2013).*

* cited by examiner

METHOD EXECUTED IN TRANSLATION SYSTEM AND INCLUDING GENERATION OF TRANSLATED TEXT AND GENERATION OF PARALLEL TRANSLATION DATA

BACKGROUND

1. Technical Field

The present disclosure relates to a method executed in a translation system, and a computer included in the translation system.

2. Description of the Related Art

In recent years, machine translation devices that translate text in a first language into text in a second language that is different from the first language are being researched and developed, and technology such as that of Japanese Unexamined Patent Application Publication No. 2004-355625, for example, has been proposed. In order to improve the translation performance of this kind of machine translation device, it is necessary to have a parallel translation corpus having collected therein a large amount of example text that can be used for translation.

SUMMARY

In one general aspect, the techniques disclosed here feature a method executed in a translation system that includes: (A) receiving source text in a first language from a user; (B) translating the source text into a second language that is different from the first language to generate first translated text; (C) acquiring a determination result as to whether or not the first translated text has been correctly translated; (D) in a case where the first translated text has not been correctly translated, generating first parallel translation data that includes the source text and the first translated text; (E) transmitting the first parallel translation data to a terminal device; (F) receiving, from the terminal device, second translated text obtained by the source text being correctly translated into the second language; and (G) registering, into a parallel translation database, second parallel translation data that includes the source text and the second translated text.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
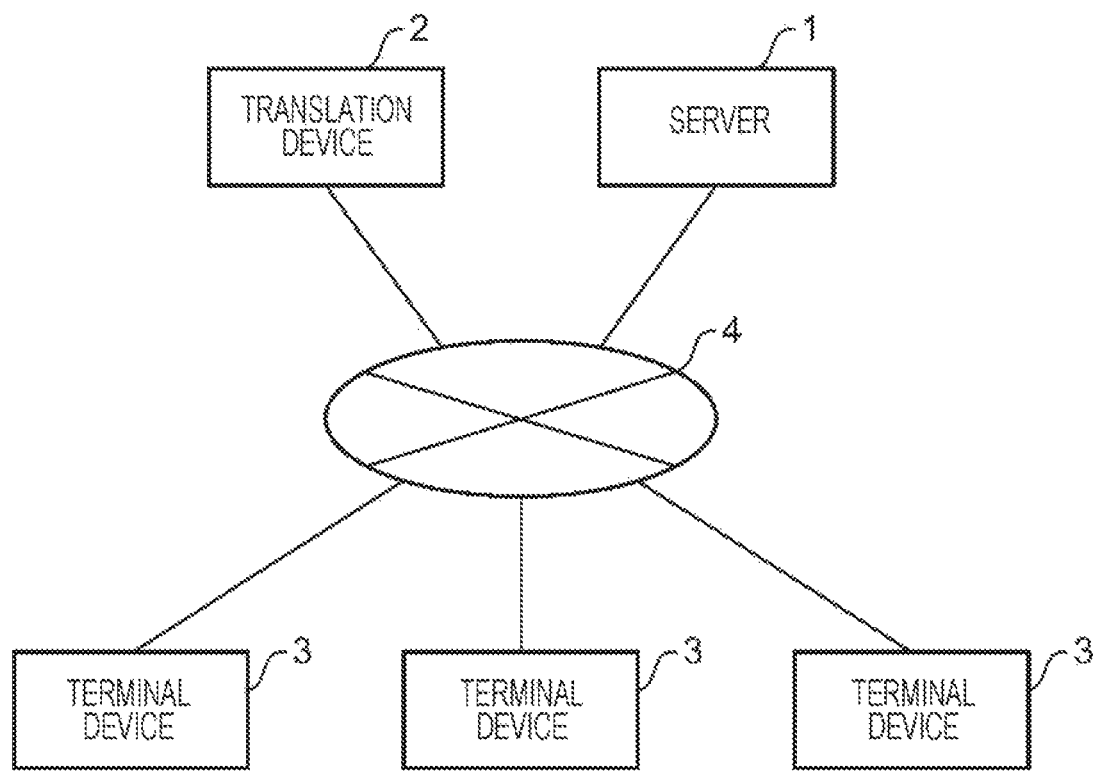
FIG. 1 is a drawing depicting the overall configuration of a translation system in embodiment 1 of the present disclosure.

Underlying Knowledge Forming Basis of the Present Disclosure

In recent years, machine translation devices that translate text in a first language into text in a second language that is different from the first language are being researched and developed. In order to improve the translation performance of this kind of machine translation device, it is necessary to have a parallel translation corpus having collected therein a large amount of example text that can be used for translation.

However, the generation of mistranslations is a problem in conventional machine translation devices, and in a case where a mistranslation has occurred, in conventional machine translation devices there are cases where the source text is revised and machine-translated once again and there are cases where translated text that has been mistranslated is revised.

A parallel translation corpus includes source text and translated text as pairs. For example, it is feasible for a machine translation device to add source text, which is a translation target that has been input, and translated text, which a translation of the source text, as a pair to a parallel translation corpus, thereby increasing the example text in the parallel translation corpus. However, in a case where the source text has been mistranslated, the source text and the mistranslated text cannot be added as a pair to the parallel translation corpus, and the example text in the parallel translation corpus cannot be increased.

In order to solve the above problem, a method according to an aspect of the present disclosure is a method in a translation system that performs translation processing between a first language and a second language that is different from the first language, the method including: receiving source text in the first language that is a translation target; generating translated text obtained by translating the source text into the second language; in a case where the translated text has not been correctly translated, generating parallel translation data that includes the source text and mistranslated text corresponding to the translated text; transmitting the parallel translation data to at least one terminal device; receiving at least one item of revised parallel translation data that includes revised translated text, obtained by the mistranslated text being correctly revised, and the source text, from the at least one terminal device; and registering the at least one item of revised parallel translation data received, in a storage unit that stores text in the first language and translated text in the second language as pairs.

According to this configuration, source text in a first language that is a translation target is acquired. Translated text obtained by translating the source text into a second language is generated. Parallel translation data that includes the source text and mistranslated text corresponding to the translated text is generated in a case where the translated text has not been correctly translated. The parallel translation data is transmitted to at least one terminal device. At least one item of revised parallel translation data including revised translated text, obtained by the mistranslated text being correctly revised, and the source text is received from the at least one terminal device. The at least one item of revised parallel translation data received is registered in a storage unit that stores text in the first language and translated text in the second language as pairs.

Consequently, the at least one item of revised parallel translation data that includes the revised translated text, obtained by the mistranslated text being correctly revised, and the source text is registered in the storage unit, and therefore it is possible to collect a large amount of example text that includes source text and translated text as pairs, and it is also possible to prevent the generation of mistranslations.

Furthermore, in the aforementioned method, the at least one item of revised parallel translation data may include the revised translated text and revised source text, which is text that is semantically the same as the source text but is expressed differently.

According to this configuration, the at least one item of revised parallel translation data includes the revised translated text and the revised source text, which is text that is semantically the same as the source text but is expressed differently.

Consequently, the revised parallel translation data including the revised source text and the revised translated text is registered in the storage unit, and therefore it is possible to further increase example text including source text and translated text as pairs.

Furthermore, in the aforementioned method, in addition, the meaning of the revised source text included in the at least one item of revised parallel translation data received may be analyzed, and in a case where the number of items of revised parallel translation data including the revised source text having the same meaning is equal to or greater than a predetermined number, the revised parallel translation data may be registered in the storage unit.

According to the above configuration, the meaning of the revised source text included in the at least one item of revised parallel translation data received is analyzed, and in a case where the number of items of revised parallel translation data including the revised source text having the same meaning is equal to or greater than the predetermined number, the revised parallel translation data is registered in the storage unit.

Consequently, rather than all of the at least one item of revised parallel translation data being stored, revised parallel translation data is registered in the storage unit in a case where the number of items of the revised parallel translation data including revised source text having the same meaning is equal to or greater than a predetermined number; therefore, revised source text that is more accurate and revised translated text can be stored in a pair as example text, and the storage capacity can be reduced.

Furthermore, in the aforementioned method, in addition, the source text and the translated text may be presented to a user, in addition, input may be received of a determination result according to the user as to whether or not the translated text has been correctly translated, on the basis of the source text and the translated text presented, and the parallel translation data may be generated in a case where a determination result indicating that the translated text has not been correctly translated is received.

According to this configuration, the source text and the translated text are presented to a user. Input is received of a determination result according to the user as to whether or not the translated text has been correctly translated, on the basis of the source text and the translated text presented. Parallel translation data is generated in a case where a determination result indicating that the translated text has not been correctly translated is received.

Consequently, in a case where it has been determined by the user that the translated text has not been correctly translated, parallel translation data is generated and transmitted to at least one terminal device, and therefore the mistranslation can be reliably determined by a user.

Furthermore, in the aforementioned method, in addition, reverse translated text obtained by translating the translated text into the first language may be generated, in addition, the source text and the reverse translated text may be presented to the user, in addition, input may be received of a determination result according to the user as to whether or not the translated text has been correctly translated, on the basis of the source text and the reverse translated text presented, and the parallel translation data may be generated in a case where a determination result indicating that the translated text has not been correctly translated is received.

According to this configuration, reverse translated text obtained by translating the translated text into the first language is generated. The source text and the reverse translated text are presented to the user. Input is received of a determination result according to the user as to whether or not the translated text has been correctly translated, on the basis of the source text and the reverse translated text presented. Parallel translation data is generated in a case where a determination result indicating that the translated text has not been correctly translated is received.

Consequently, even with a user who cannot understood the second language, it is possible to determine whether or not the translated text has been correctly translated, by comparing the source text in the first language and the reverse translated text in the first language.

Furthermore, in the aforementioned method, in a case where the translated text has not been correctly translated, the parallel translation data including the source text, the mistranslated text, and the reverse translated text may be generated, the parallel translation data may be transmitted to the at least one terminal device, the at least one item of revised parallel translation data including revised translated text obtained by the mistranslated text being correctly revised, revised reverse translated text obtained by the reverse translated text being correctly revised, and the source text may be received from the at least one terminal device, and the at least one item of revised parallel translation data received may be registered in the storage unit.

According to this configuration, in a case where the translated text has not been correctly translated, parallel translation data that includes the source text, mistranslated text, and reverse translated text is generated. The parallel translation data is transmitted to at least one terminal device. At least one item of revised parallel translation data including revised translated text obtained by the mistranslated text being correctly revised, revised reverse translated text obtained by the reverse translated text being correctly revised, and the source text is received from the at least one terminal device. The at least one item of revised parallel translation data received is registered in the storage unit.

Consequently, revised reverse translated text obtained by the reverse translated text being correctly revised is also received, and therefore the revised reverse translated text and the revised translated text can be registered in the storage unit as a pair, and the example text can be further increased.

Furthermore, in the aforementioned method, in addition, reverse translated text obtained by translating the translated text into the first language may be generated, in addition, the meaning of the source text may be analyzed, and also the meaning of the reverse translated text may be analyzed, in addition, it may be determined whether or not the meaning of the source text and the meaning of the reverse translated text are the same, and the parallel translation data may be generated in a case where it is determined that the meaning of the source text and the meaning of the reverse translated text are not the same.

According to this configuration, reverse translated text obtained by translating the translated text into the first language is generated. The meaning of the source text is analyzed, and also the meaning of the reverse translated text is analyzed. It is determined whether or not the meaning of the source text and the meaning of the reverse translated text are the same. The parallel translation data is generated in a case where it is determined that the meaning of the source text and the meaning of the reverse translated text are not the same.

Consequently, it can be determined that the translated text is correct in a case where the meaning of the source text and the meaning of the reverse translated text are the same, and it can be determined that the translated text is not correct in a case where the meaning of the source text and the meaning of the reverse translated text are different; therefore, a translation device can accurately determine whether or not the translated text has been correctly translated, without it being necessary for the user to determine whether or not the translated text has been correctly translated.

A translation device according to another aspect of the present disclosure is a translation device that performs translation processing between a first language and a second language that is different from the first language, the translation device being provided with: a storage unit that stores text in the first language and translated text in the second language as pairs; an acquisition unit that acquires source text in the first language that is a translation target; a translated text generation unit that generates translated text obtained by translating the source text into the second language; a parallel translation data transmission unit that generates parallel translation data including the source text and mistranslated text corresponding to the translated text, in a case where the translated text has not been correctly translated; a transmission unit that transmits the parallel translation data to at least one terminal device; a reception unit that receives at least one item of revised parallel translation data including revised translated text, obtained by the mistranslated text being correctly revised, and the source text, from the at least one terminal device; and a registration unit that registers the at least one item of revised parallel translation data received, in the storage unit.

According to this configuration, the storage unit stores text in the first language and translated text in the second language as pairs. Source text in the first language that is a translation target is acquired. Translated text obtained by translating the source text into a second language is generated. Parallel translation data that includes the source text and mistranslated text corresponding to the translated text is generated in a case where the translated text has not been correctly translated. The parallel translation data is transmitted to at least one terminal device. At least one item of revised parallel translation data including revised translated text, obtained by the mistranslated text being correctly revised, and the source text is received from the at least one terminal device. The at least one item of revised parallel translation data received is registered in the storage unit.

Consequently, the at least one item of revised parallel translation data including the revised translated text, obtained by the mistranslated text being correctly revised, and the source text is registered in the storage unit, and therefore it is possible to collect a large amount of example text that includes source text and translated text as pairs, and it is also possible to prevent the generation of mistranslations.

A translation program according to another aspect of the present disclosure is a translation program for performing translation processing between a first language and a second language that is different from the first language, the translation program causing a computer to function as: a storage unit that stores text in the first language and translated text in the second language as pairs; an acquisition unit that acquires source text in the first language that is a translation target; a translated text generation unit that generates translated text obtained by translating the source text into the second language; a parallel translation data transmission unit that generates parallel translation data that includes the source text and mistranslated text corresponding to the translated text, in a case where the translated text has not been correctly translated; a transmission unit that transmits the parallel translation data to at least one terminal device; a reception unit that receives at least one item of revised parallel translation data that includes revised translated text, obtained by the mistranslated text being correctly revised, and the source text, from the at least one terminal device; and a registration unit that registers the at least one item of revised parallel translation data received, in the storage unit.

According to this configuration, the storage unit stores text in the first language and translated text in the second language as pairs. Source text in the first language that is a translation target is acquired. Translated text obtained by translating the source text into a second language is generated. Parallel translation data that includes the source text and mistranslated text corresponding to the translated text is generated in a case where the translated text has not been correctly translated. The parallel translation data is transmitted to at least one terminal device. At least one item of revised parallel translation data including revised translated text, obtained by the mistranslated text being correctly revised, and the source text is received from the at least one terminal device. The at least one item of revised parallel translation data received is registered in the storage unit.

Consequently, the at least one item of revised parallel translation data that includes the revised translated text, obtained by the mistranslated text being correctly revised, and the source text is registered in the storage unit, and therefore it is possible to collect a large amount of example text that includes source text and translated text as pairs, and it is also possible to prevent the generation of mistranslations.

Hereinafter, embodiments according to the present disclosure will be described based on the drawings. It should be noted that the embodiments hereinafter are exemplary embodiments of the present disclosure, and do not restrict the technical scope of the present disclosure. Furthermore, configurations denoted by the same reference characters in the drawings indicate the same configurations, and descriptions thereof are omitted as appropriate.

Embodiment 1

FIG. 1 is a drawing depicting the overall configuration of a translation system in embodiment 1 of the present disclosure.

The translation system depicted in FIG. 1 is provided with a server 1, a translation device 2, and a plurality of terminal devices 3.

The translation device 2 is a smartphone, a tablet computer, a personal computer, or a dedicated translation device, for example.

The translation device 2 receives user input of source text in a first language that is a translation target. It should be noted that the source text is input by means of speech. In this case, the translation device 2 is provided with a microphone that receives user speech input of the source text in the first language that is the translation target, and a speech conversion unit that converts the speech which has been input by the microphone into text data. The translation device 2 transmits translation target data indicating the translation target that has been input by the user, to the server 1.

It should be noted that the source text may be input by means of text. In this case, the translation device 2 may be provided with an input unit that receives user text input of the source text in the first language that is the translation target. The input device is a keyboard, a mouse, or a touch panel, for example.

The server 1 is communicably connected to the translation device 2 via a network 4. Furthermore, the server 1 is communicably connected to the plurality of terminal devices 3 via the network 4. The network 4 is the Internet, for example.

The server 1 performs translation processing between the first language and a second language that is different from the first language. The server 1 acquires the source text in the first language that is the translation target, generates translated text obtained by translating the source text into the second language, and in a case where the translated text has not been correctly translated, generates parallel translation data that includes the source text and mistranslated text corresponding to the translated text, and transmits the parallel translation data to the plurality of terminal devices 3.

Each of the plurality of terminal devices 3 is a smartphone, a tablet computer, or a personal computer, for example. In embodiment 1, the translation system is provided with the plurality of terminal devices 3; however, it should be noted that the present disclosure is not particularly restricted thereto, and the translation system may be provided with at least one terminal device 3.

Each of the plurality of terminal devices 3 receives the parallel translation data that includes the source text and the mistranslated text from the server 1. Each of the plurality of terminal devices 3 receives a revision to the mistranslated text. Each of the plurality of terminal devices 3 transmits, to the server 1, revised parallel translation data that includes revised translated text, obtained by the mistranslated text being correctly revised, and the source text. The server 1 receives a plurality of items of revised parallel translation data from the plurality of terminal devices 3, and registers the received plurality of items of revised parallel translation data in a storage unit.

In FIG. 1, the translation system is provided with three terminal devices 3; however, it should be noted that the present disclosure is not particularly restricted thereto, and it is sufficient for two or more terminal devices 3 to be provided.

Figure 2:
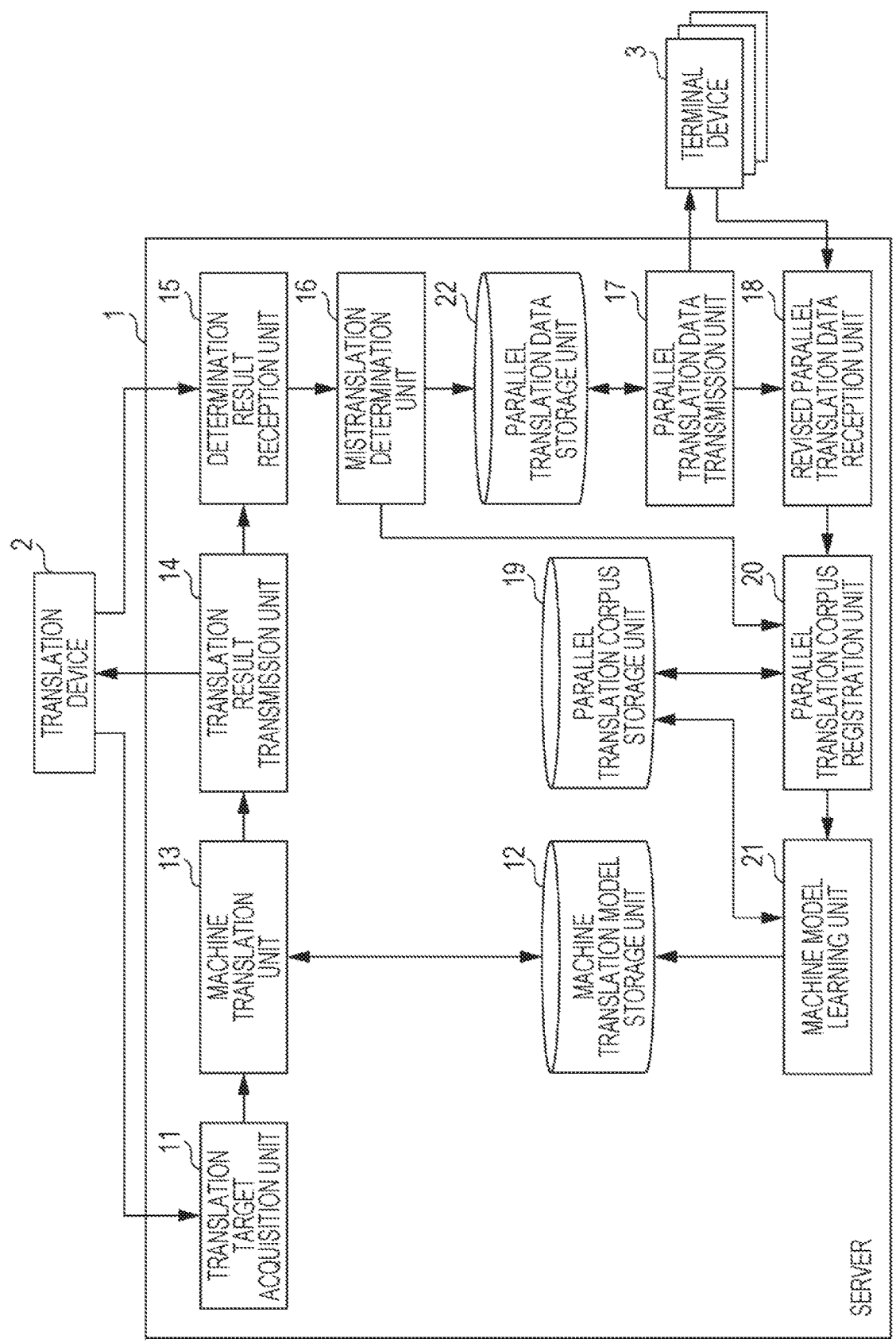
FIG. 2 is a drawing depicting the configuration of a server in embodiment 1 of the present disclosure.

FIG. 2 is a drawing depicting the configuration of the server in embodiment 1 of the present disclosure.

The server 1 depicted in FIG. 2 is provided with a translation target acquisition unit 11, a machine translation model storage unit 12, a machine translation unit 13, a translation result transmission unit 14, a determination result reception unit 15, a mistranslation determination unit 16, a parallel translation data transmission unit 17, a revised parallel translation data reception unit 18, a parallel translation corpus storage unit 19, a parallel translation corpus registration unit 20, a machine model learning unit 21, and a parallel translation data storage unit 22.

The server 1 is provided with a computer including a CPU (central processing unit), a ROM (read only memory), a RAM (random access memory), and an auxiliary storage device, for example.

The blocks depicted in FIG. 2 are realized by the CPU executing a program (translation program) that is stored in the auxiliary storage device and causes the computer to function as the server 1, for example. Consequently, a translation method is implemented in the computer. In FIG. 2, the blocks depicted by quadrilateral shapes are mainly functionally realized by the CPU, and the blocks depicted by cylindrical shapes are mainly functionally realized by a storage device constituted by the ROM, the RAM, the auxiliary storage device, or the like.

It should be noted that the translation device 2 may be provided with some or all of the configuration of the server 1.

The translation target acquisition unit 11 acquires the source text in the first language that is the translation target. In the present embodiment 1, the translation target acquisition unit 11 receives translation target data that includes the source text in the first language from the translation device 2.

The machine translation model storage unit 12 is connected to the machine translation unit 13, and stores a machine translation model that is used in translation processing between the first language and the second language. The machine translation model storage unit 12 stores a machine translation model for translating from the first language into the second language.

The machine translation unit 13 generates translated text obtained by translating the source text acquired by the translation target acquisition unit 11 into the second language that is different from the first language. The machine translation unit 13 generates the translated text by applying the source text to the machine translation model stored in the machine translation model storage unit 12. The machine translation unit 13 performs machine translation using statistical machine translation, translation by means of a neural net, rule-based translation, or the like, and there are no particular restrictions regarding the machine translation method employed by the machine translation unit 13. The machine translation unit 13 outputs the source text acquired by the translation target acquisition unit 11 and the translated text to the translation result transmission unit 14.

The translation result transmission unit 14 transmits translation result information that includes the source text in the first language and the translated text in the second language to the translation device 2. It should be noted that the translation result transmission unit 14 may transmit translation result information that includes only the translated text in the second language to the translation device 2.

The translation device 2 presents the source text and the translated text to the user. The translation device 2 receives input of a determination result according to the user as to whether or not the translated text has been correctly translated, on the basis of the source text and the translated text presented.

The determination result reception unit 15 receives determination result information that indicates a determination result according to the user as to whether or not the translated text included in the translation result information has been correctly translated, from the translation device 2.

The mistranslation determination unit 16 determines whether or not the translated text has been correctly translated, on the basis of the determination result information received from the translation device 2. In a case where the translated text has not been correctly translated, the mistranslation determination unit 16 generates parallel translation data that includes the source text and mistranslated text corresponding to the translated text, and stores the parallel translation data in the parallel translation data storage unit 22. In other words, the mistranslation determination unit 16 generates parallel translation data in a case where a determination result indicating that the translated text has not been correctly translated has been received. Furthermore, in a case where the translated text has been correctly translated, the mistranslation determination unit 16 generates parallel translation data that includes the source text and the translated text, and outputs the parallel translation data to the parallel translation corpus registration unit 20.

The parallel translation data storage unit 22 stores the parallel translation data that includes the source text and the mistranslated text, generated when the mistranslation determination unit 16 has determined that the translated text has not been correctly translated.

The parallel translation data transmission unit 17 reads the parallel translation data stored in the parallel translation data storage unit 22, and transmits the parallel translation data that has been read to the plurality of terminal devices 3. It should be noted that the parallel translation data transmission unit 17 may transmit parallel translation data each time parallel translation data is stored in the parallel translation data storage unit 22. Furthermore, the parallel translation data transmission unit 17 may transmit a predetermined number of items of parallel translation data all at once each time the predetermined number of items of parallel translation data is stored in the parallel translation data storage unit 22. Furthermore, the parallel translation data transmission unit 17 may transmit the parallel translation data periodically.

The revised parallel translation data reception unit 18 receives a plurality of items of revised parallel translation data that includes revised translated text, obtained by the mistranslated text being correctly revised, and the source text from the plurality of terminal devices 3.

The parallel translation corpus storage unit 19 stores a parallel translation corpus having associated therein source text written in the first language and translated text of the source text in the second language. The parallel translation corpus includes translated text pairs in which source text in the first language and translated text obtained by translating the source text into the second language are included as pairs.

The parallel translation corpus registration unit 20 is connected to the parallel translation corpus storage unit 19, and registers, in the parallel translation corpus storage unit 19, the plurality of items of revised parallel translation data received by the revised parallel translation data reception unit 18. The parallel translation corpus registration unit 20 newly registers the revised parallel translation data received by the revised parallel translation data reception unit 18, in the parallel translation corpus stored in the parallel translation corpus storage unit 19. The parallel translation corpus registration unit 20 registers a parallel translation corpus by storing source text and revised translated text in accordance with each other in the parallel translation corpus storage unit 19.

The machine model learning unit 21 is connected to the machine translation model storage unit 12, and learns the machine translation model stored in the machine translation model storage unit 12, using the parallel translation corpus. In a case where a new parallel translation corpus has been registered by the parallel translation corpus registration unit 20, the machine model learning unit 21 relearns the machine translation model stored in the machine translation model storage unit 12.

Figure 3:
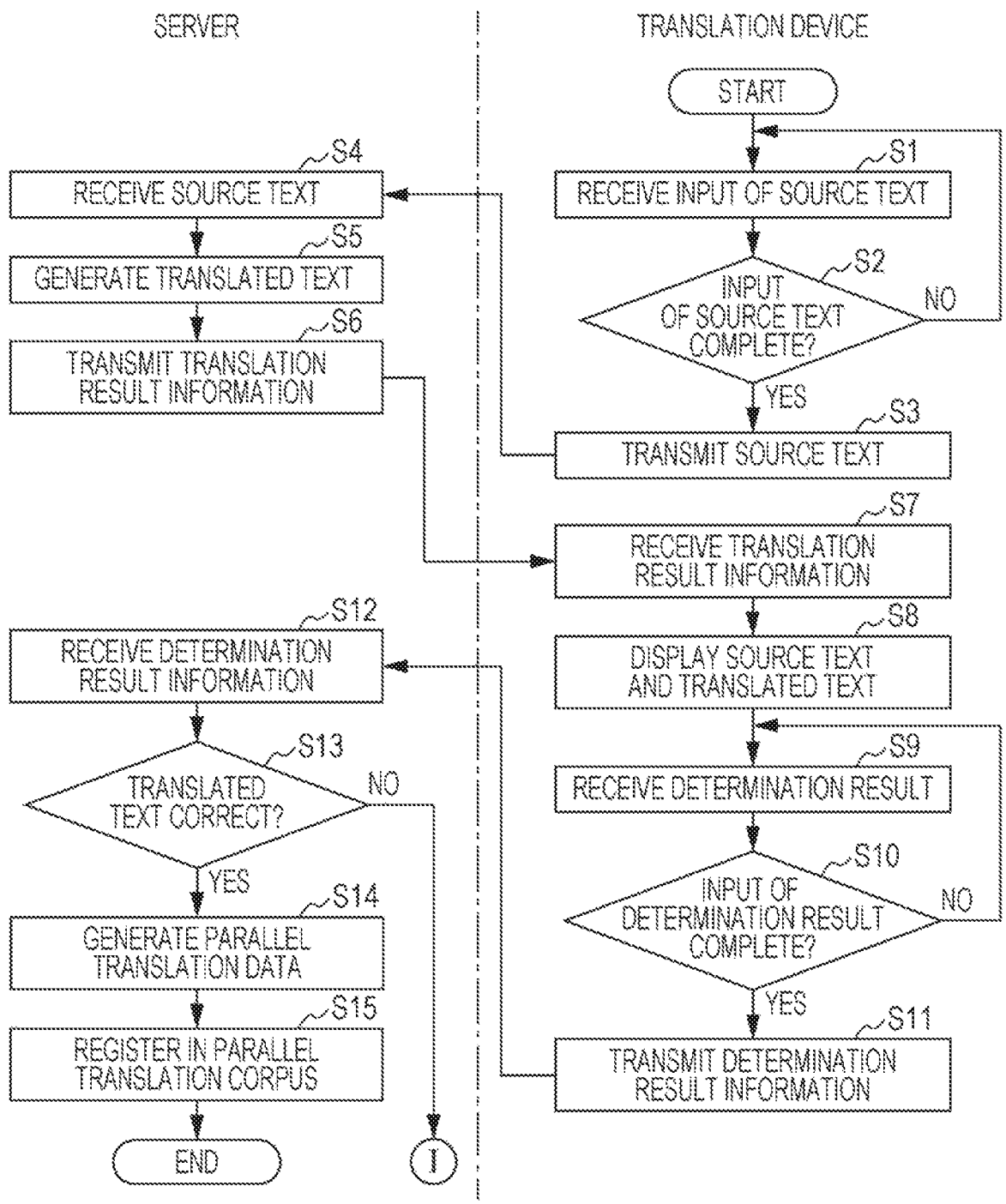
FIG. 3 is a first flowchart for describing translation processing in the translation system in embodiment 1 of the present disclosure.
Figure 4:
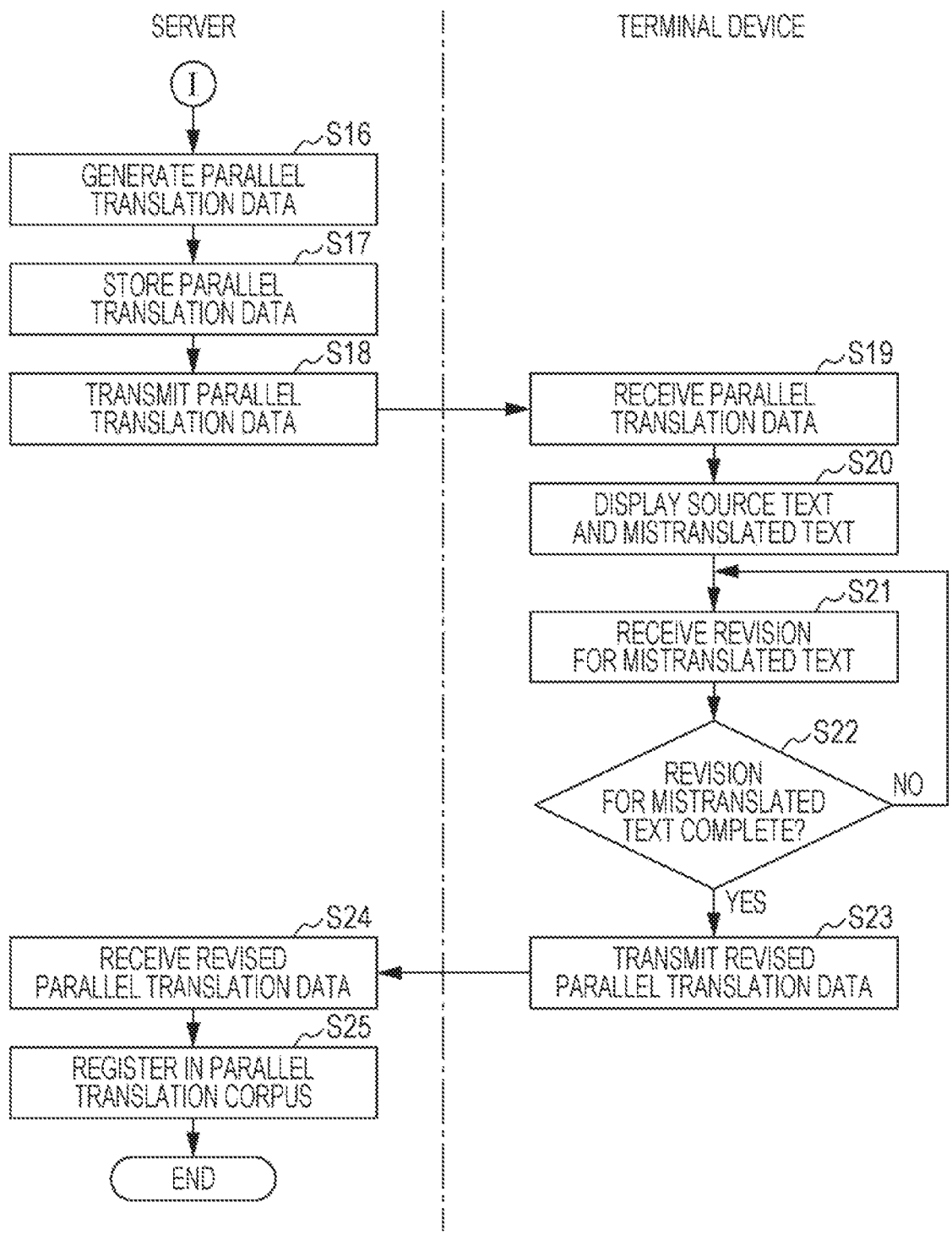
FIG. 4 is a second flowchart for describing translation processing in the translation system in embodiment 1 of the present disclosure.

FIG. 3 is a first flowchart for describing translation processing in the translation system in embodiment 1 of the present disclosure, and FIG. 4 is a second flowchart for describing translation processing in the translation system in embodiment 1 of the present disclosure.

First, in step S1, the translation device 2 receives user input of the source text in the first language that is the translation target. It should be noted that the input of the source text is performed by means of speech input or text input.

Next, in step S2, the translation device 2 determines whether or not the user input of the source text has been completed. Here, in a case where it has been determined that the input of the source text has not been completed ("no" in step S2), processing returns to step S1.

However, in a case where it has been determined that the input of the source text has been completed ("yes" in step S2), in step S3, the translation device 2 transmits the source text that has been input by the user to the server 1.

Next, in step S4, the translation target acquisition unit 11 of the server 1 receives the source text in the first language that is the translation target from the translation device 2.

Next, in step S5, the machine translation unit 13 generates translated text obtained by translating the source text in the first language into the second language.

Next, in step S6, the translation result transmission unit 14 transmits translation result information that includes the source text in the first language and the translated text in the second language to the translation device 2.

Next, in step S7, the translation device 2 receives the translation result information transmitted by the server 1.

Next, in step S8, the translation device 2 displays the source text and the translated text on the basis of the translation result information received.

Next, in step S9, the translation device 2 receives input of a determination result of the user as to whether or not the translated text displayed has been correctly translated. The user confirms the translated text displayed, and determines whether or not the source text input by the user has been correctly translated. The translation device 2 displays a button to be pressed when correctly translated and a button to be pressed when not correctly translated, for example, and the user presses either button.

Next, in step S10, the translation device 2 determines whether or not the input of the determination result according to the user has been completed. Here, in a case where it has been determined that the input of the determination result has not been completed ("no" in step S10), processing returns to step S9.

However, in a case where it has been determined that the input of the determination result has been completed ("yes" in step S10), in step S11, the translation device 2 transmits, to the server 1, determination result information that indicates the determination result according to the user as to whether or not the translated text has been correctly translated.

Next, in step S12, the determination result reception unit 15 of the server 1 receives the determination result information transmitted by the translation device 2.

Next, in step S13, the mistranslation determination unit 16 determines whether or not the translated text has been correctly translated, on the basis of the determination result information received by the determination result reception unit 15. Here, in a case where it has been determined that the translated text has been correctly translated ("yes" in step S13), in step S14, the mistranslation determination unit 16 generates parallel translation data that includes the source text and the translated text that has been correctly translated. The mistranslation determination unit 16 outputs the generated parallel translation data to the parallel translation corpus registration unit 20.

Next, in step S15, the parallel translation corpus registration unit 20 registers the parallel translation data generated by the mistranslation determination unit 16, in the parallel translation corpus stored in the parallel translation corpus storage unit 19.

In the present embodiment 1, parallel translation data in which the source text and the translated text that has been correctly translated are included as a pair is registered in the parallel translation corpus; however, it should be noted that the present disclosure is not particularly restricted thereto, and the parallel translation data may not be registered in the parallel translation corpus. In this case, if it is determined in step S13 that the translated text has been correctly translated, the translation processing ends.

However, in a case where it has been determined that the translated text has not been correctly translated ("no" in step S13), in step S16, the mistranslation determination unit 16 generates parallel translation data that includes the source text and mistranslated text corresponding to the translated text.

Next, in step S17, the mistranslation determination unit 16 stores the generated parallel translation data in the parallel translation data storage unit 22.

Next, in step S18, the parallel translation data transmission unit 17 reads the parallel translation data stored in the parallel translation data storage unit 22, and transmits the parallel translation data that has been read to the plurality of terminal devices 3.

Next, in step S19, the terminal devices 3 receive the parallel translation data transmitted by the server 1. In the flowchart of FIG. 4, the parallel translation data is transmitted to one terminal device from among the plurality of terminal devices; however, it should be noted that the parallel translation data is transmitted also to other terminal devices, and similar processing is performed in each of the terminal devices.

Next, in step S20, the terminal device 3 displays the source text and the mistranslated text on the basis of the received parallel translation data.

Next, in step S21, the terminal device 3 receives a revision according to a translator for the mistranslated text displayed. The translator confirms the source text and the mistranslated text displayed, and revises the mistranslated text to translated text that is correct. The terminal device 3 is provided with an input unit such as a keyboard, a mouse, or a touch panel, for example, and the input unit receives the revision to the mistranslated text according to the translator.

Figure 5:
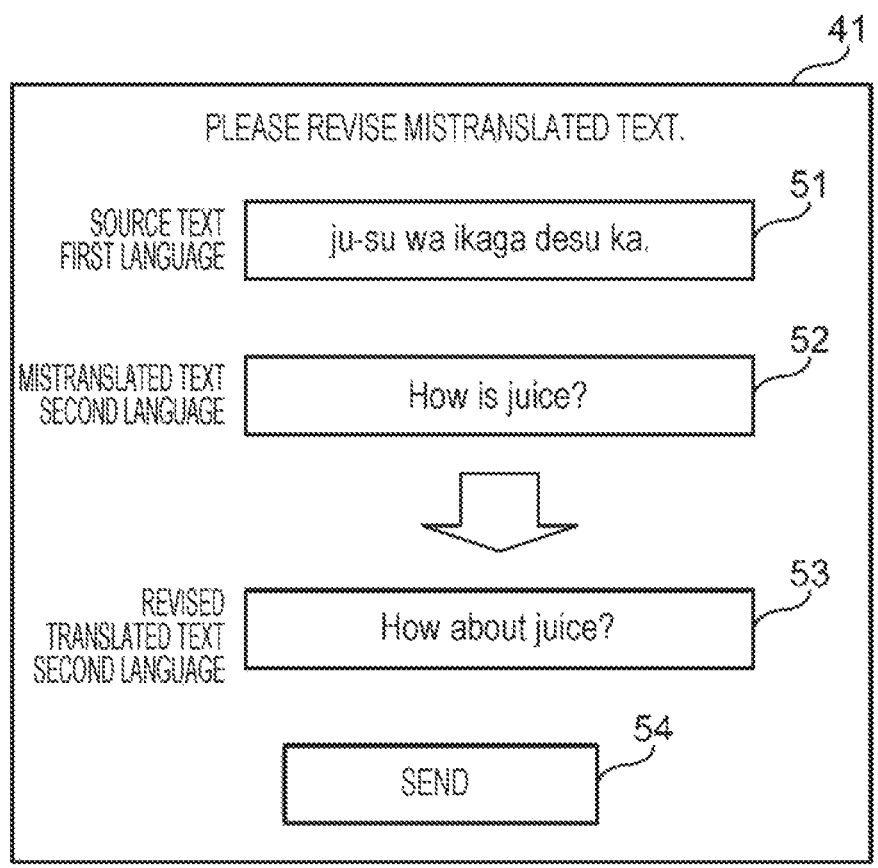
FIG. 5 is a drawing depicting an example of a display screen for receiving a revision to mistranslated text in the present embodiment 1.

FIG. 5 is a drawing depicting an example of a display screen for receiving a revision to mistranslated text in the present embodiment 1.

As depicted in FIG. 5, the terminal device 3 displays a display screen 41 that includes source text 51 in the first language, mistranslated text 52 in the second language, an input field 53 for allowing the user to input a revision to the mistranslated text, and a transmission button 54 for transmitting translated text that has been revised to the server 1. The translator inputs revised translated text obtained by revising the mistranslated text in the second language.

In the example depicted in FIG. 5, source text 51 of "ju-su wa ikaga desu ka" in the first language is displayed, and mistranslated text 52 of "How is juice?" is displayed. In response, the translator inputs revised translated text of "How about juice?" obtained by correctly translating the source text, into the input field 53. Then, once the input of the revised translated text has been completed, the translator presses the transmission button 54.

Returning to FIG. 4, next, in step S22, the terminal device 3 determines whether or not the revision to the mistranslated text according to the translator has been completed. In a case where the transmission button 54 depicted in FIG. 5 has been pressed, the terminal device 3 determines that the revision to the mistranslated text according to the translator has been completed. Here, in a case where it has been determined that the revision to the mistranslated text has not been completed ("no" in step S22), processing returns to step S21.

However, in a case where it has been determined that the revision to the mistranslated text has been completed ("yes" in step S22), in step S23, the terminal device 3 transmits revised parallel translation data that includes revised translated text, obtained by the mistranslated text being correctly revised, and the source text to the server 1.

Next, in step S24, the revised parallel translation data reception unit 18 of the server 1 receives the revised parallel translation data transmitted by the terminal device 3. It should be noted that the revised parallel translation data reception unit 18 receives revised parallel translation data from each of the plurality of terminal devices 3.

Next, in step S25, the parallel translation corpus registration unit 20 registers the revised parallel translation data received by the revised parallel translation data reception unit 18, in the parallel translation corpus stored in the parallel translation corpus storage unit 19.

In the example depicted in FIG. 5, the parallel translation corpus registration unit 20 registers source text of "ju-su wa ikaga desu ka" in the first language and revised translated text in the second language of "How about juice?" as a pair in the parallel translation corpus.

In the present embodiment 1, a plurality of items of revised parallel translation data received from the plurality of terminal devices 3 are all registered in the parallel translation corpus storage unit 19; however, it should be noted that the present disclosure is not particularly restricted thereto, and only one item of revised parallel translation data may be registered in the parallel translation corpus storage unit 19 with regard to revised translated text having the same character strings. Furthermore, in a case where the number of items of revised parallel translation data having the same character strings for the revised translated text is equal to or greater than a predetermined number, the parallel translation corpus registration unit 20 may register the revised parallel translation data in question in the parallel translation corpus storage unit 19.

Next, a translation system in a modified example of the present embodiment 1 will be described. In the present embodiment 1, the terminal device 3 receives a revision to mistranslated text; however, in the modified example of the present embodiment 1, the terminal device 3 receives a revision to mistranslated text and also receives input of text that is similar to the source text. In the modified example of the present embodiment 1, each of the plurality of items of revised parallel translation data may include revised translated text and revised source text (text that is similar to the source text), which is text that is semantically the same as the source text but is expressed differently. Thus, first revised parallel translation data that includes the source text and the revised translated text as a pair, and second revised parallel translation data that includes text that is similar to the source text and the revised translated text as a pair can be registered in the parallel translation corpus, and the example text stored in the parallel translation corpus can be increased.

Figure 6:
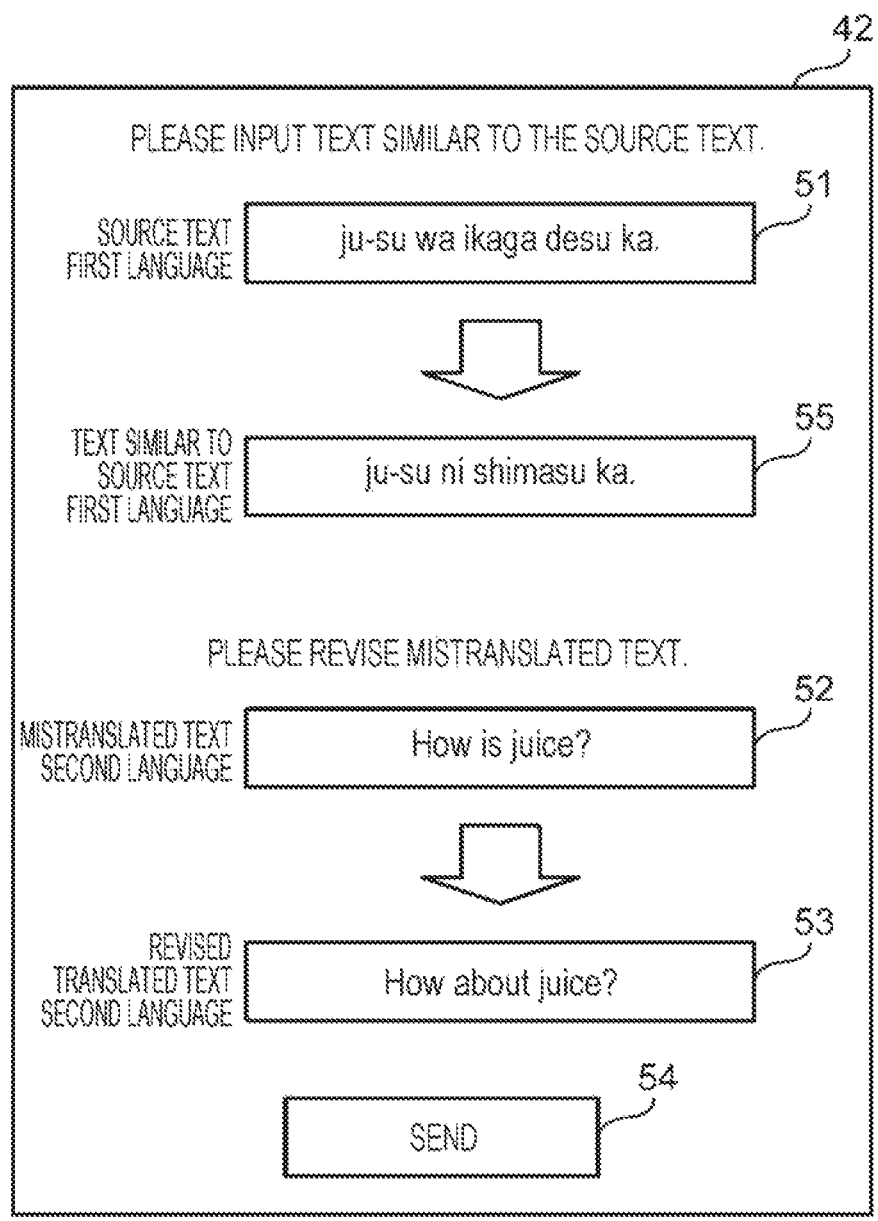
FIG. 6 is a drawing depicting an example of a display screen for receiving a revision to mistranslated text and input of text that is similar to the source text in a modified example of the present embodiment 1.

FIG. 6 is a drawing depicting an example of a display screen for receiving a revision to mistranslated text and input of text that is similar to the source text in the modified example of the present embodiment 1.

As depicted in FIG. 6, the terminal device 3 displays a display screen 42 that includes the source text 51 in the first language, the mistranslated text 52 in the second language, the input field 53 for allowing the user to input a revision to the mistranslated text, the transmission button 54 for transmitting translated text that has been revised to the server 1, and an input field 55 for allowing the user to input text that is similar to the source text. The translator inputs revised translated text obtained by revising the mistranslated text in the second language, and also inputs text that is similar to the source text. The text that is similar to the source text is text that is semantically the same as the source text but is expressed differently.

In the example depicted in FIG. 6, the source text 51 of "ju-su wa ikaga desu ka" in the first language is displayed, and the mistranslated text 52 of "How is juice?" is displayed. In response, the translator inputs the revised translated text of "How about juice?" obtained by correctly translating the source text, into the input field 53, and also inputs the text of "ju-su ni shimasu ka" that is similar to the source text into the input field 55. Then, once the input of the revised translated text and the text that is similar to the source text has been completed, the translator presses the transmission button 54.

In a case where the transmission button 54 depicted in FIG. 6 has been pressed, the terminal device 3 determines that the input of the revision to the mistranslated text and the text that is similar to the source text by the user has been completed. In a case where it has been determined that the input of the revision to the mistranslated text and the text that is similar to the source text has been completed, the terminal device 3 transmits first revised parallel translation data that includes the source text and the revised translated text obtained by the mistranslated text being correctly revised, and second revised parallel translation data that includes the revised translated text and the text that is similar to the source text, to the server 1.

Next, the revised parallel translation data reception unit 18 of the server 1 receives the first revised parallel translation data and the second revised parallel translation data transmitted by the terminal device 3. It should be noted that the revised parallel translation data reception unit 18 receives the first revised parallel translation data and the second revised parallel translation data from each of the plurality of terminal devices 3.

Next, the parallel translation corpus registration unit 20 registers the first revised parallel translation data and the second revised parallel translation data received by the revised parallel translation data reception unit 18, in the parallel translation corpus stored in the parallel translation corpus storage unit 19. Furthermore, the parallel translation corpus registration unit 20 may perform predetermined analysis processing such as a syntax analysis and a semantic analysis with respect to the text that is similar to the source text included in the second revised parallel translation data, and may analyze the meaning of the text that is similar to the source text included in each of the plurality of items of second revised parallel translation data received from the plurality of terminal devices 3. Then, in a case where the number of items of second revised parallel translation data including text that is similar to the source text having the same meaning is equal to or greater than a predetermined number, the parallel translation corpus registration unit 20 may register the second revised parallel translation data in question in the parallel translation corpus.

Embodiment 2

In the aforementioned embodiment 1, the source text and the translated text are presented to the user, and input of a determination result according to the user as to whether or not the translated text has been correctly translated is received; however, in embodiment 2, reverse translated text obtained by translating the translated text into the first language is generated, the source text and the reverse translated text are presented to the user, and input of a determination result according to the user as to whether or not the translated text has been correctly translated is received on the basis of the source text and the reverse translated text presented.

Figure 7:
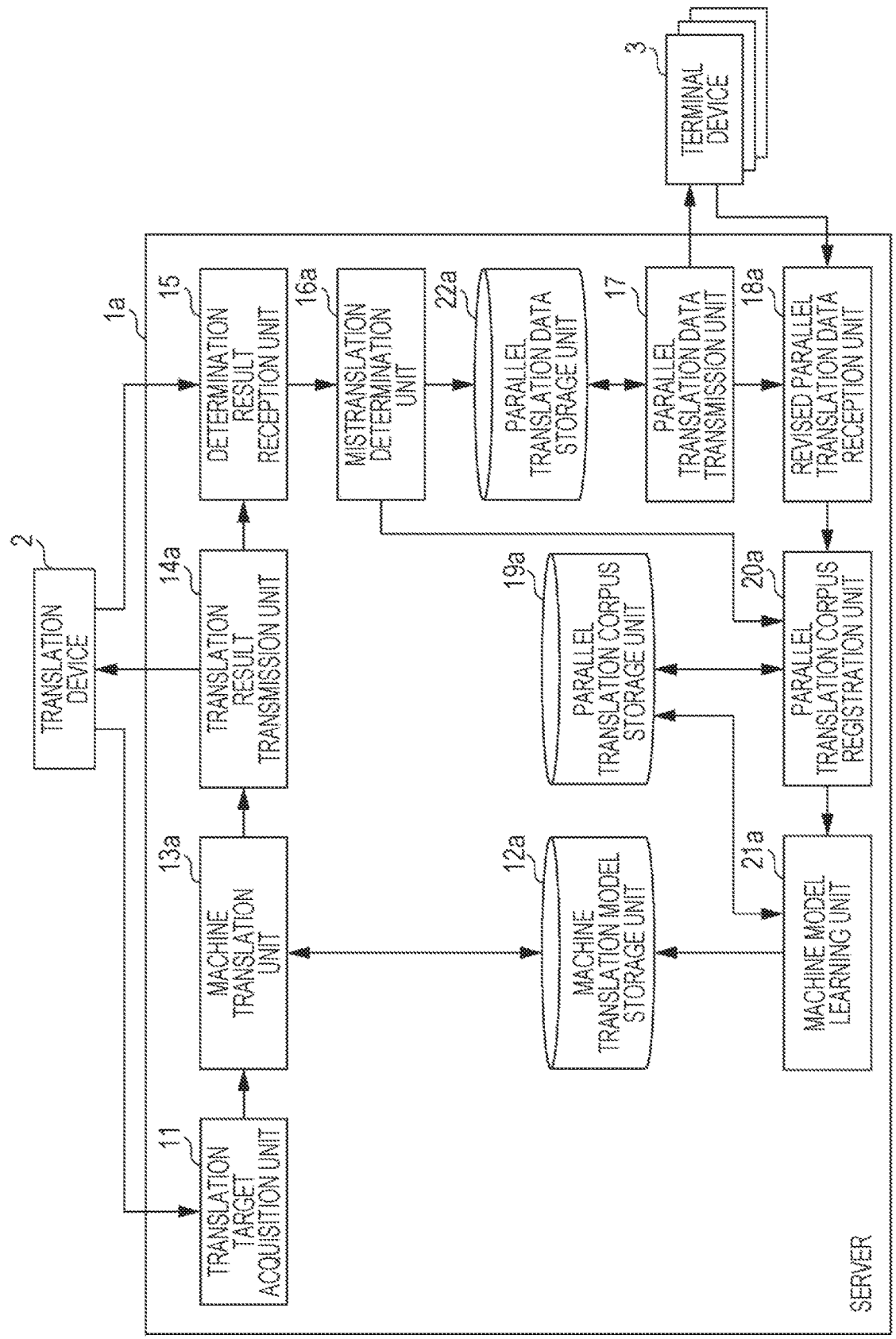
FIG. 7 is a drawing depicting the configuration of a server in embodiment 2 of the present disclosure.

FIG. 7 is a drawing depicting the configuration of a server in embodiment 2 of the present disclosure.

A server 1a depicted in FIG. 7 is provided with the translation target acquisition unit 11, a machine translation model storage unit 12a, a machine translation unit 13a, a translation result transmission unit 14a, the determination result reception unit 15, a mistranslation determination unit 16a, the parallel translation data transmission unit 17, a revised parallel translation data reception unit 18a, a parallel translation corpus storage unit 19a, a parallel translation corpus registration unit 20a, a machine model learning unit 21a, and a parallel translation data storage unit 22a.

It should be noted that the translation device 2 may be provided with some or all of the configuration of the server 1a.

The machine translation model storage unit 12a stores a first machine translation model for translating from the first language into the second language, and a second machine translation model for translating from the second language into the first language.

The machine translation unit 13a generates translated text obtained by translating the source text acquired by the translation target acquisition unit 11 into the second language which is different from the first language. The machine translation unit 13a generates the translated text by applying the source text to the first machine translation model stored in the machine translation model storage unit 12a. Furthermore, the machine translation unit 13a generates reverse translated text obtained by translating the translated text in the second language into the first language. The machine translation unit 13a generates the reverse translated text by applying the translated text to the second machine translation model stored in the machine translation model storage unit 12a. The machine translation unit 13a outputs the source text acquired by the translation target acquisition unit 11 and the reverse translated text to the translation result transmission unit 14a. It should be noted that the machine translation unit 13a may also output the translated text to the translation result transmission unit 14a in a case where the translated text is to be presented to the user.

The translation result transmission unit 14a transmits translation result information that includes the source text in the first language and the reverse translated text in the first language to the translation device 2. It should be noted that the translation result transmission unit 14a may transmit translation result information that includes the source text in the first language, the translated text in the second language, and the reverse translated text in the first language to the translation device 2.

The translation device 2 presents the source text and the reverse translated text to the user. The translation device 2 receives input of a determination result according to the user as to whether or not the translated text has been correctly translated, on the basis of the source text and the reverse translated text presented.

The mistranslation determination unit 16a determines whether or not the translated text has been correctly translated, on the basis of the determination result information received from the translation device 2. In a case where the translated text has not been correctly translated, the mistranslation determination unit 16a generates parallel translation data that includes the source text, mistranslated text corresponding to the translated text, and the reverse translated text, and stores the parallel translation data in the parallel translation data storage unit 22a. In other words, the mistranslation determination unit 16a generates parallel translation data in a case where a determination result indicating that the translated text has not been correctly translated has been received. Furthermore, in a case where the translated text has been correctly translated, the mistranslation determination unit 16a generates first parallel translation data that includes the source text and the translated text, and second parallel translation data that includes the translated text and the reverse translated text, and outputs the first parallel translation data and the second parallel translation data to the parallel translation corpus registration unit 20a.

The parallel translation data storage unit 22a stores parallel translation data that includes the source text, the mistranslated text, and the reverse translated text, generated when the mistranslation determination unit 16a has determined that the translated text has not been correctly translated.

The revised parallel translation data reception unit 18a receives a plurality of items of revised parallel translation data that includes revised translated text obtained by the mistranslated text being correctly revised, revised reverse translated text obtained by the reverse translated text being correctly revised, and the source text from the plurality of terminal devices 3.

The parallel translation corpus storage unit 19a stores a parallel translation corpus having associated therein source text written in the first language and translated text of the source text in the second language. The parallel translation corpus includes translated text pairs in which source text in the first language and translated text obtained by translating the source text into the second language are included as pairs. Furthermore, the parallel translation corpus includes translated text pairs in which translated text in the second language and reverse translated text obtained by translating the translated text into the first language are included as pairs.

The parallel translation corpus registration unit 20a registers a plurality of items of revised parallel translation data received by the revised parallel translation data reception unit 18a, in the parallel translation corpus storage unit 19a. The parallel translation corpus registration unit 20a newly registers the revised parallel translation data received by the revised parallel translation data reception unit 18a, in the parallel translation corpus stored in the parallel translation corpus storage unit 19a. The parallel translation corpus registration unit 20a registers the source text and the revised translated text in association with each other in the parallel translation corpus, and also registers the revised reverse translated text and the revised translated text in association with each other in the parallel translation corpus.

The machine model learning unit 21a learns the first machine translation model stored in the machine translation model storage unit 12a, by means of the parallel translation corpus. Furthermore, the machine model learning unit 21a learns the second machine translation model stored in the machine translation model storage unit 12a, by means of the parallel translation corpus. In a case where a new parallel translation corpus has been registered by the parallel translation corpus registration unit 20a, the machine model learning unit 21a relearns the first machine translation model and the second machine translation model stored in the machine translation model storage unit 12a.

Figure 8:
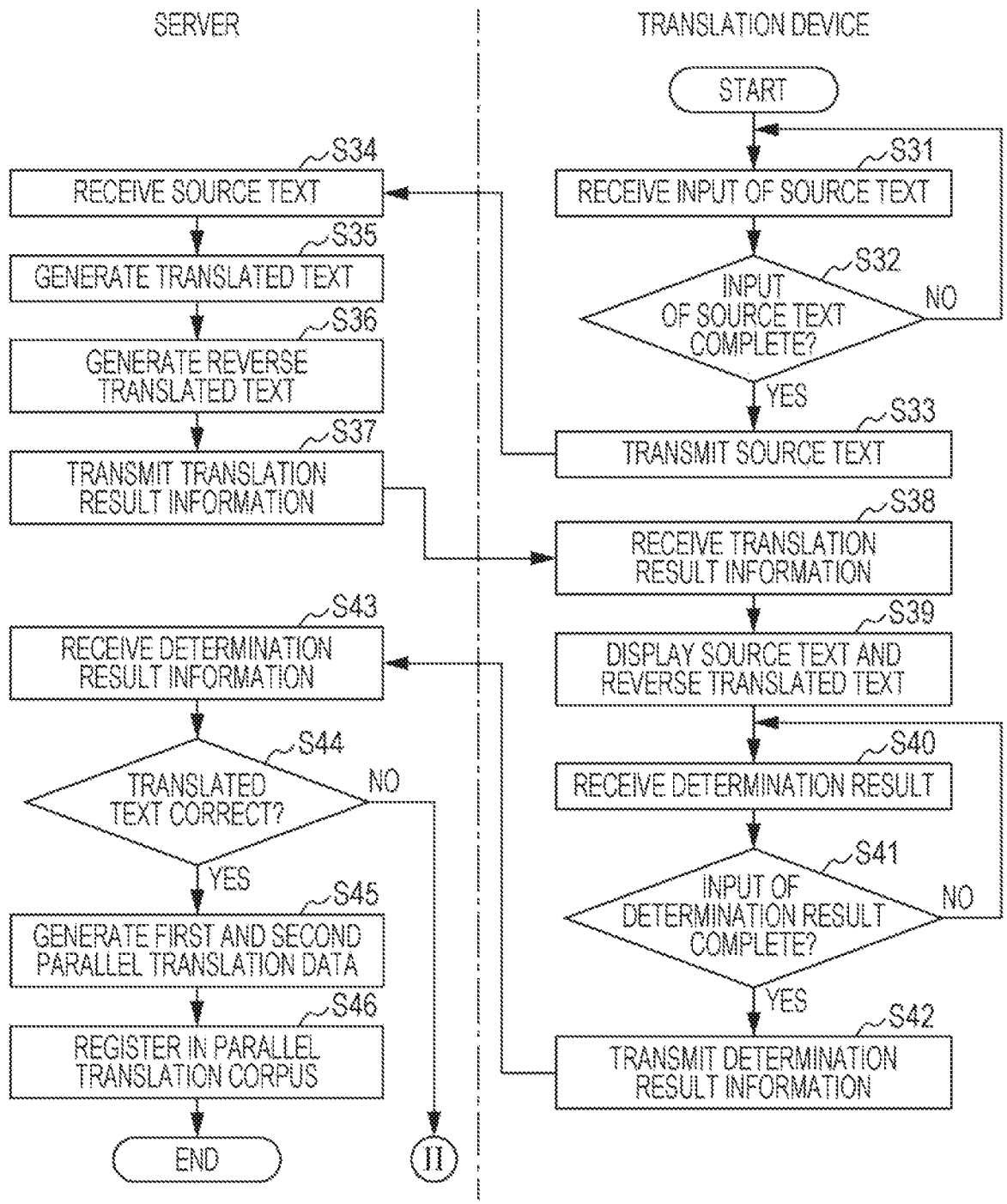
FIG. 8 is a first flowchart for describing translation processing in the translation system in embodiment 2 of the present disclosure.
Figure 9:
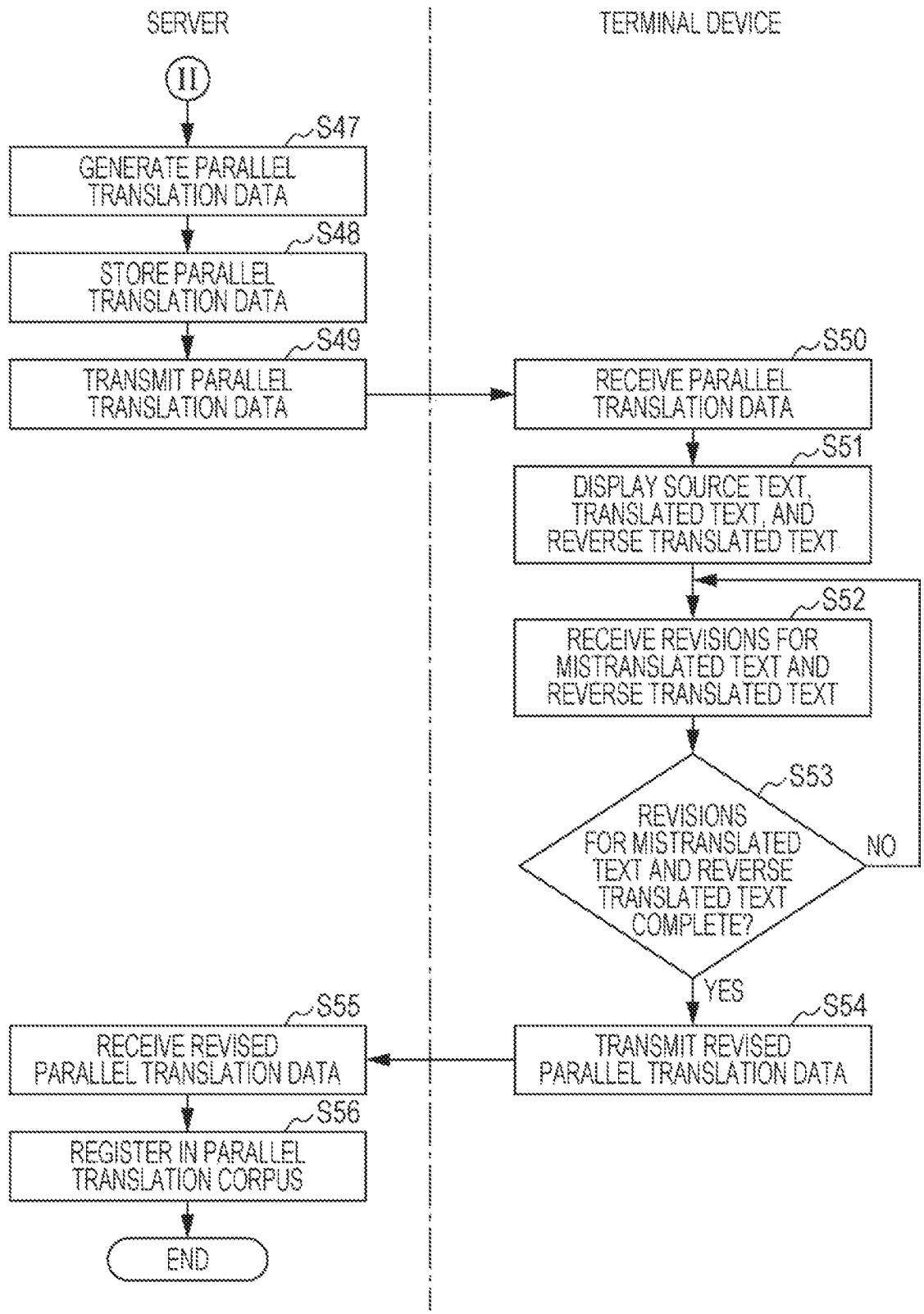
FIG. 9 is a second flowchart for describing translation processing in the translation system in embodiment 2 of the present disclosure.

FIG. 8 is a first flowchart for describing translation processing in the translation system in embodiment 2 of the present disclosure, and FIG. 9 is a second flowchart for describing translation processing in the translation system in embodiment 2 of the present disclosure.

It should be noted that the processing of step S31 to step S35 depicted in FIG. 8 is the same as the processing of step S1 to step S5 depicted in FIG. 3, and therefore a description thereof is omitted.

Next, in step S36, the machine translation unit 13a generates reverse translated text obtained by translating the translated text in the second language into the first language.

Next, in step S37, the translation result transmission unit 14a transmits translation result information that includes the source text in the first language and the reverse translated text in the first language to the translation device 2.

Next, in step S38, the translation device 2 receives the translation result information transmitted by the server 1a.

Next, in step S39, the translation device 2 displays the source text and the reverse translated text on the basis of the translation result information received.

Next, in step S40, the translation device 2 receives input of a determination result of the user as to whether or not the translated text has been correctly translated. The user confirms the reverse translated text displayed, and determines whether or not the source text input by the user has been correctly translated. In other words, the semantic content of the reverse translated text, obtained by translating the translated text, and the semantic content of the source text are the same if the translated text has been correctly translated. It is therefore possible to determine whether or not the translated text has been correctly translated, by comparing the source text and the reverse translated text, even with a user who cannot understood the second language. The translation device 2 displays a button to be pressed when correctly translated and a button to be pressed when not correctly translated, for example, and the user presses either button.

It should be noted that the processing of step S41 to step S44 depicted in FIG. 8 is the same as the processing of step S10 to step S13 depicted in FIG. 3, and therefore a description thereof is omitted.

In a case where it has been determined that the translated text has been correctly translated ("yes" in step S44), in step S45, the mistranslation determination unit 16a generates first parallel translation data that includes the source text and the translated text, and second parallel translation data that includes the reverse translated text and the translated text. The mistranslation determination unit 16a outputs the generated first parallel translation data and second parallel translation data to the parallel translation corpus registration unit 20a.

Next, in step S46, the parallel translation corpus registration unit 20a registers the first parallel translation data and the second parallel translation data generated by the mistranslation determination unit 16a, in the parallel translation corpus stored in the parallel translation corpus storage unit 19a.

In the present embodiment 2, the first parallel translation data in which the source text and the translated text that has been correctly translated are included as a pair, and the second parallel translation data in which the reverse translated text and the translated text are included as a pair are registered in the parallel translation corpus; however, it should be noted that the present disclosure is not particularly restricted thereto, and the first parallel translation data and the second parallel translation data may not be registered in the parallel translation corpus. In this case, if it is determined in step S44 that the translated text has been correctly translated, the translation processing ends.

However, in a case where it has been determined that the translated text has not been correctly translated ("no" in step S44), in step S47, the mistranslation determination unit 16a generates parallel translation data that includes the source text, mistranslated text corresponding to the translated text, and the reverse translated text.

Next, in step S48, the mistranslation determination unit 16a stores the generated parallel translation data in the parallel translation data storage unit 22a.

Next, in step S49, the parallel translation data transmission unit 17 reads the parallel translation data stored in the parallel translation data storage unit 22a, and transmits the parallel translation data that has been read to the plurality of terminal devices 3.

Next, in step S50, the terminal device 3 receives the parallel translation data transmitted by the server 1a. In the flowchart of FIG. 9, the parallel translation data is transmitted to one terminal device from among the plurality of terminal devices; however, it should be noted that the parallel translation data is transmitted also to other terminal devices, and similar processing is performed in each of the terminal devices.

Next, in step S51, the terminal device 3 displays the source text, the mistranslated text, and the reverse translated text on the basis of the received parallel translation data.

Next, in step S52, the terminal device 3 receives revisions according to a translator for the mistranslated text and the reverse translated text displayed. The translator confirms the source text and the mistranslated text displayed and also confirms the source text and the reverse translated text displayed, and revises the mistranslated text to translated text that is correct and also revises the reverse translated text to reverse translated text that is correct. The terminal device 3 is provided with an input unit such as a keyboard, a mouse, or a touch panel, for example, and the input unit receives the revisions to the mistranslated text and the reverse translated text according to the translator.

Figure 10:
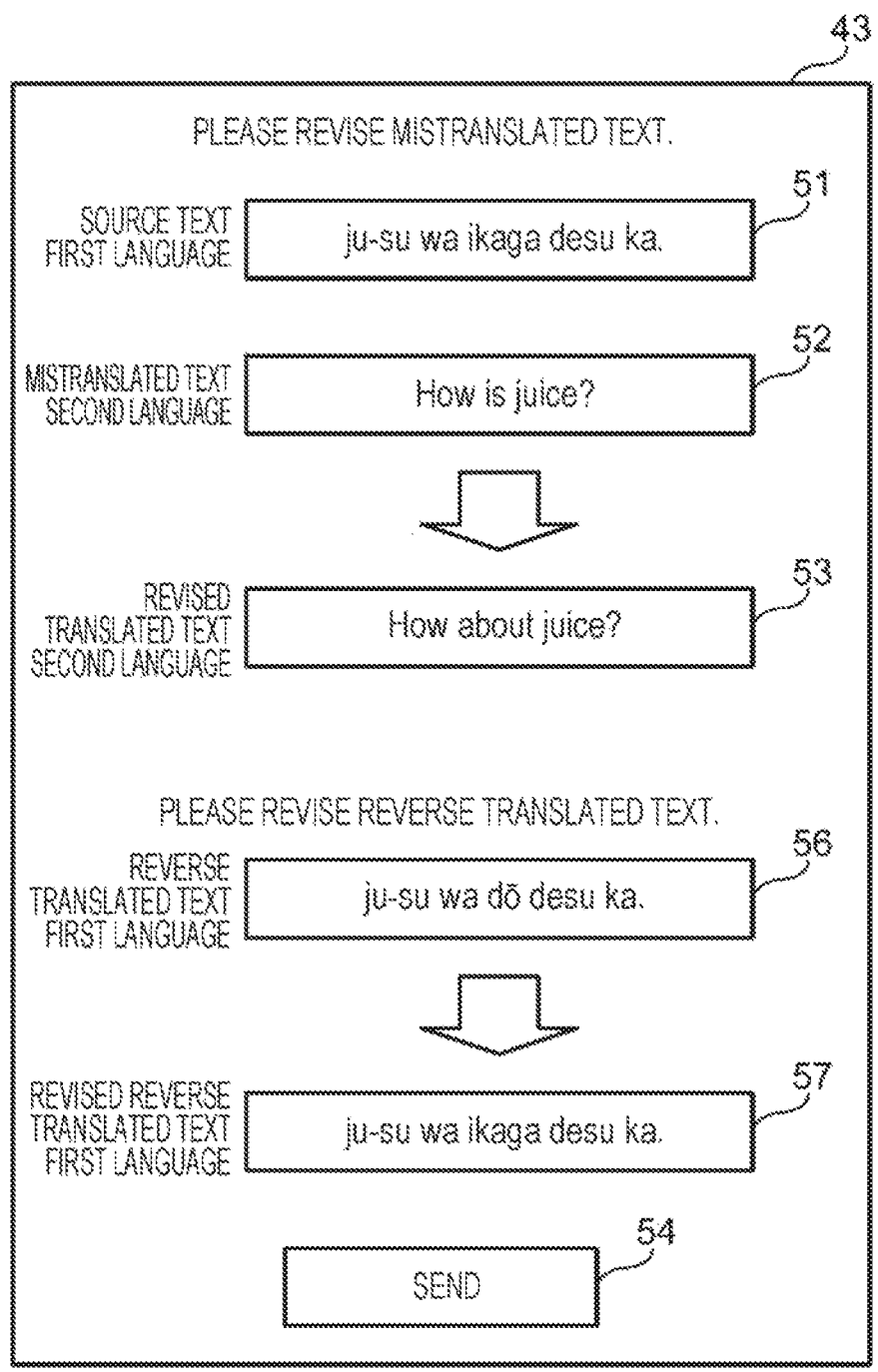
FIG. 10 is a drawing depicting an example of a display screen for receiving revisions to mistranslated text and reverse translated text in the present embodiment 2.

FIG. 10 is a drawing depicting an example of a display screen for receiving revisions to the mistranslated text and the reverse translated text in the present embodiment 2.

As depicted in FIG. 10, the terminal device 3 displays a display screen 43 that includes the source text 51 in the first language, the mistranslated text 52 in the second language, the input field 53 for allowing the user to input a revision to the mistranslated text, reverse translated text 56 in the first language, an input field 57 for allowing the user to input a revision to the reverse translated text, and the transmission button 54 for transmitting translated text that has been revised to the server 1a. The translator inputs revised translated text obtained by revising the mistranslated text in the second language, and also inputs revised reverse translated text obtained by revising the reverse translated text in the first language.

In the example depicted in FIG. 10, the source text 51 of "ju-su wa ikaga desu ka" in the first language is displayed, and the mistranslated text 52 of "How is juice?" is displayed. In response, the translator inputs the revised translated text of "How about juice?" obtained by correctly translating the source text, into the input field 53. Furthermore, the reverse translated text 56 in the first language of "ju-su wa do desu ka" is displayed. In response, the translator inputs the revised reverse translated text of "ju-su wa ikaga desu ka" obtained by correctly reverse translating the translated text, into the input field 57. Then, once the input of the revised translated text and the revised reverse translated text has been completed, the translator presses the transmission button 54.

Returning to FIG. 9, next, in step S53, the terminal device 3 determines whether or not the revisions to the mistranslated text and the reverse translated text according to the translator have been completed. In a case where the transmission button 54 depicted in FIG. 10 has been pressed, the terminal device 3 determines that the revisions to the mistranslated text and the reverse translated text according to the translator have been completed. Here, in a case where it has been determined that the revisions to the mistranslated text and the reverse translated text have not been completed ("no" in step S53), processing returns to step S52.

However, in a case where it has been determined that the revisions to the mistranslated text and the reverse translated text have been completed ("yes" in step S53), in step S54, the terminal device 3 transmits revised parallel translation data that includes the revised translated text obtained by the mistranslated text being correctly revised, the revised reverse translated text obtained by the reverse translated text being correctly revised, and the source text to the server 1*a*.

Next, in step S55, the revised parallel translation data reception unit 18*a* of the server 1*a* receives the revised parallel translation data transmitted by the terminal device 3. It should be noted that the revised parallel translation data reception unit 18*a* receives revised parallel translation data from each of the plurality of terminal devices 3.

Next, in step S56, the parallel translation corpus registration unit 20*a* associates and registers the source text and the revised translated text, which are included in the revised parallel translation data received by the revised parallel translation data reception unit 18*a*, in the parallel translation corpus stored in the parallel translation corpus storage unit 19*a*, and also associates and registers the revised reverse translated text and the revised translated text in the parallel translation corpus.

It should be noted that in the present embodiment 2 also, similar to the modified example of embodiment 1, the terminal device 3 may receive input of text that is similar to the source text as well as receiving revisions to the mistranslated text and the reverse translated text. In this case, each of the plurality of items of revised parallel translation data may include revised translated text, revised reverse translated text, and revised source text (text that is similar to the source text) which is text that is semantically the same as the source text but is expressed differently.

Embodiment 3

In the aforementioned embodiment 2, the source text and the reverse translated text are presented to the user, and input is received of a determination result according to the user as to whether or not the translated text has been correctly translated, on the basis of the source text and the reverse translated text presented; however, in embodiment 3, the meaning of the source text is analyzed and also the meaning of the reverse translated text is analyzed, it is determined whether or not the meaning of the source text and the meaning of the reverse translated text are the same, and parallel translation data is generated in a case where it is determined that the meaning of the source text and the meaning of the reverse translated text are not the same.

Figure 11:
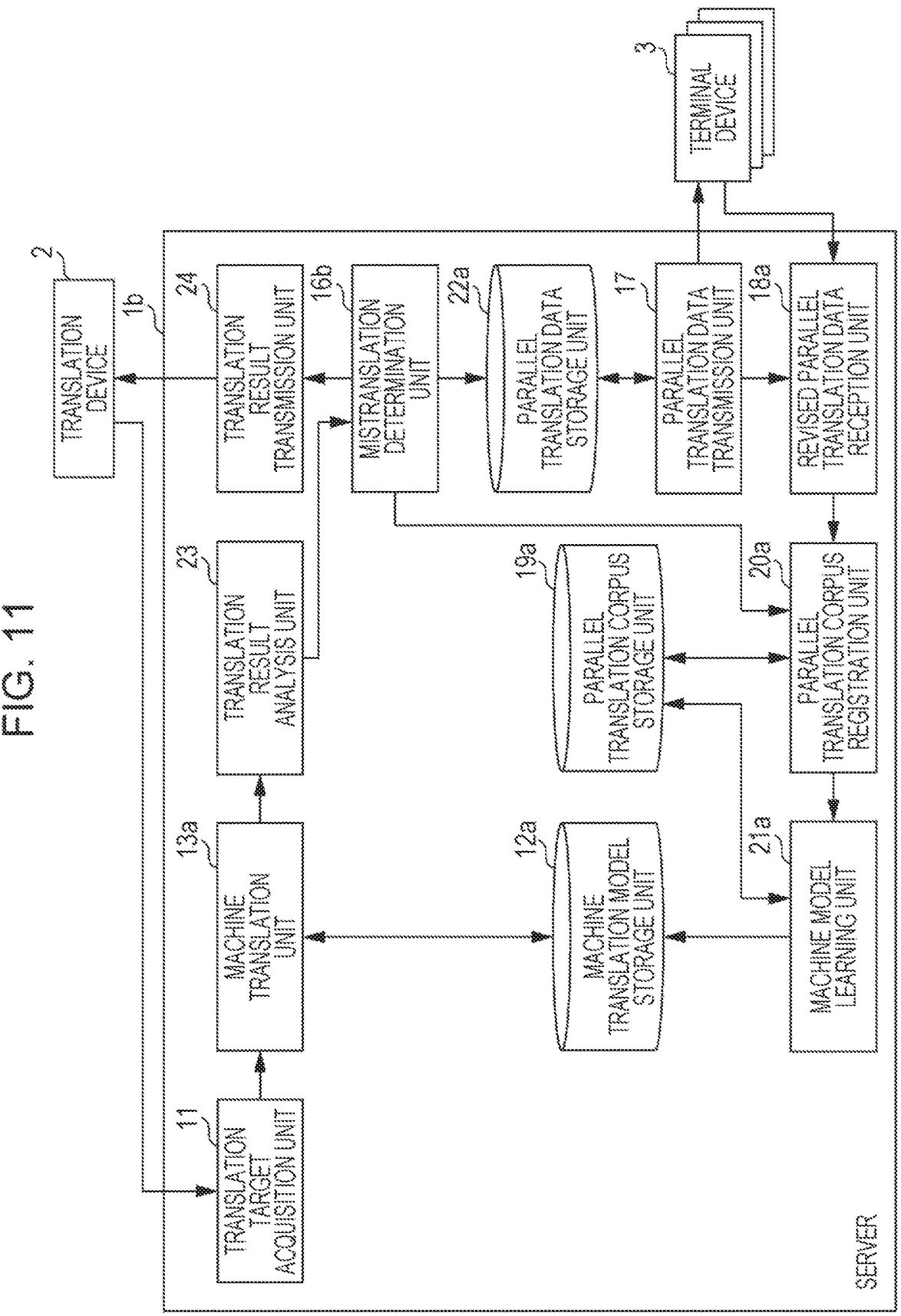
FIG. 11 is a drawing depicting the configuration of a server in embodiment 3 of the present disclosure.

FIG. 11 is a drawing depicting the configuration of a server in embodiment 3 of the present disclosure.

A server 1*b* depicted in FIG. 11 is provided with the translation target acquisition unit 11, the machine translation model storage unit 12*a*, the machine translation unit 13*a*, a mistranslation determination unit 16*b*, the parallel translation data transmission unit 17, the revised parallel translation data reception unit 18*a*, the parallel translation corpus storage unit 19*a*, the parallel translation corpus registration unit 20*a*, the machine model learning unit 21*a*, the parallel translation data storage unit 22*a*, a translation result analysis unit 23, and a translation result transmission unit 24.

It should be noted that the translation device 2 may be provided with some or all of the configuration of the server 1*b*.

The translation result analysis unit 23 analyzes the meaning of the source text and also analyzes the meaning of the reverse translated text. More specifically, the translation result analysis unit 23 performs a morpheme analysis, a syntax analysis, and a semantic analysis on the source text and acquires a semantic frame for the source text, and also performs a morpheme analysis, a syntax analysis, and a semantic analysis on the reverse translated text and acquires a semantic frame for the reverse translated text.

The mistranslation determination unit 16*b* determines whether or not the meaning of the source text and the meaning of the reverse translated text are the same. The mistranslation determination unit 16*b* determines whether or not the semantic frame for the source text and the semantic frame for the reverse translated text are the same. The mistranslation determination unit 16*b* generates parallel translation data when having determined that the meaning of the source text and the meaning of the reverse translated text are not the same. In other words, it can be determined that the translated text for the source text has been correctly translated in a case where the meaning of the source text and the meaning of the reverse translated text obtained by reverse translating the translated text for the source text are the same. Thus, the mistranslation determination unit 16*b*, when having determined that the meaning of the source text and the meaning of the reverse translated text are not the same, generates parallel translation data that includes the source text, mistranslated text corresponding to the translated text, and the reverse translated text, and stores the parallel translation data in the parallel translation data storage unit 22*a*.

In a case where it has been determined by the mistranslation determination unit 16*b* that the meaning of the source text and the meaning of the reverse translated text are the same, the translation result transmission unit 24 transmits translation result information that includes the source text in the first language, the translated text in the second language, and the reverse translated text in the first language to the translation device 2. It should be noted that the translation result transmission unit 24 may transmit translation result information that includes only the translated text in the second language to the translation device 2. The translation device 2, upon receiving the translation result information from the server 1*b*, presents the source text, the translated text, and the reverse translated text to the user.

It should be noted that, since the reverse translated text is used to determine whether or not the source text has been correctly revised, the translation result transmission unit 24 may transmit translation result information that includes the source text in the first language and the translated text in the second language but does not include the reverse translated text, to the translation device 2.

Furthermore, in a case where it has been determined that the meaning of the source text and the meaning of the reverse translated text are not the same, in other words, in a case where the translated text for the source text has not been correctly translated, the translation result transmission unit 24 may transmit information indicating that the source text could not be correctly translated to the translation device 2, and the translation device 2 may not display the translation result for the source text. In this case, the translation device 2 may notify the user that the source text could not be correctly translated. In addition, the translation result transmission unit 24 may transmit translation result information including the source text, the mistranslated text that could not be correctly translated, and the reverse translated text to the translation device 2, and the translation device 2 may display the source text, the mistranslated text, and the reverse translated text.

Figure 12:
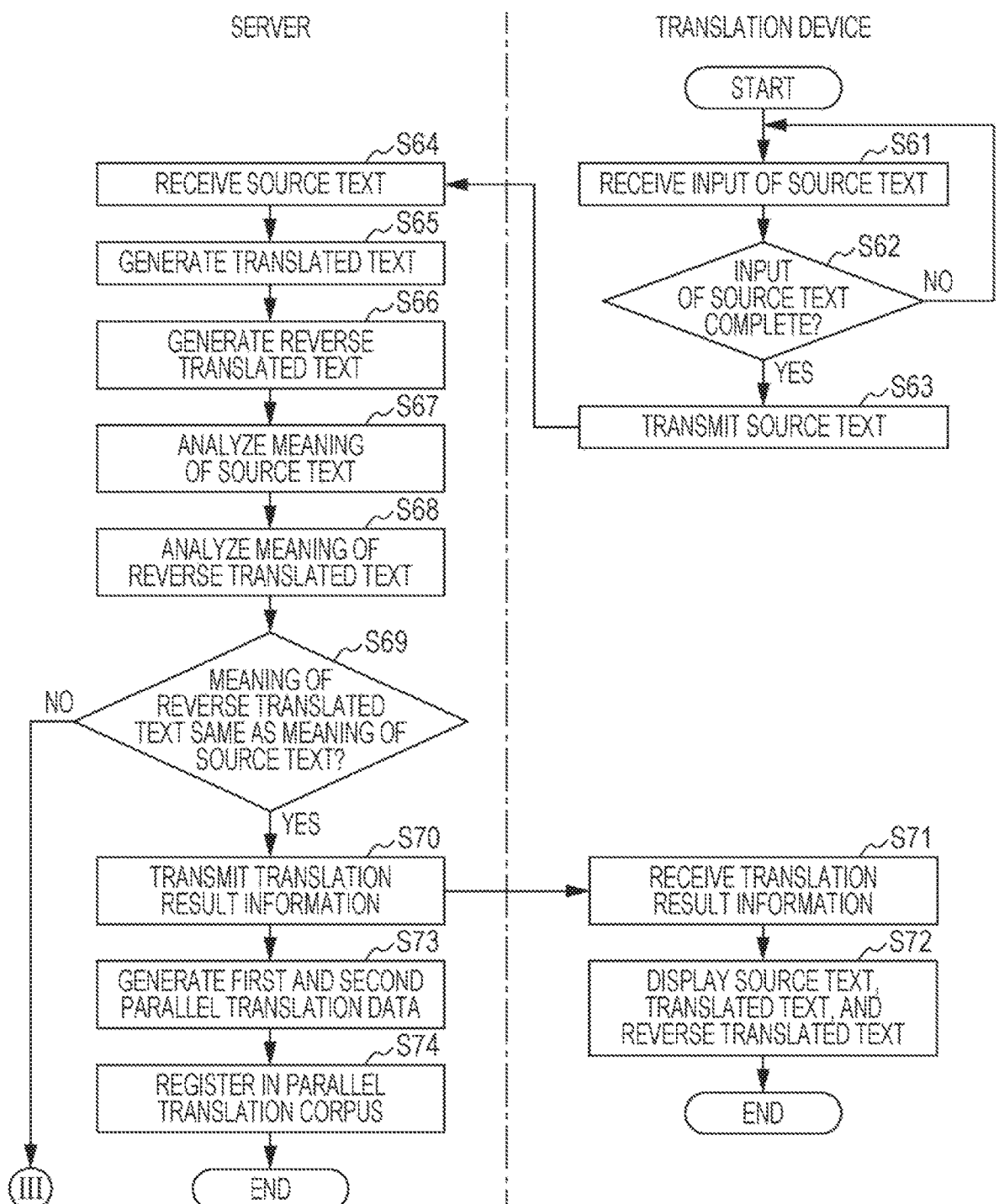
FIG. 12 is a first flowchart for describing translation processing in the translation system in embodiment 3 of the present disclosure.
Figure 13:
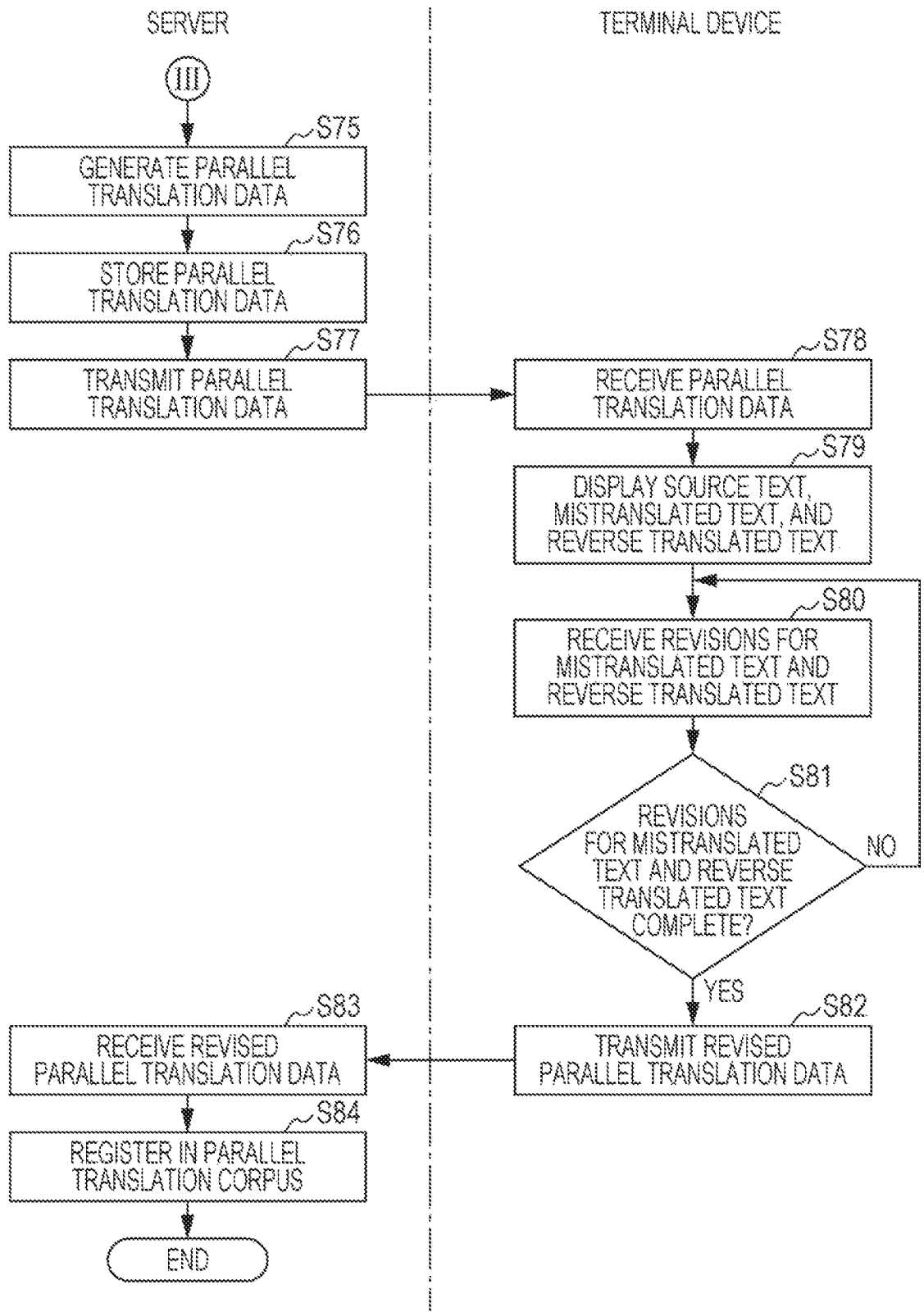
FIG. 13 is a second flowchart for describing translation processing in the translation system in embodiment 3 of the present disclosure.

FIG. 12 is a first flowchart for describing translation processing in the translation system in embodiment 3 of the present disclosure, and FIG. 13 is a second flowchart for describing translation processing in the translation system in embodiment 3 of the present disclosure.

It should be noted that the processing of step S61 to step S66 depicted in FIG. 12 is the same as the processing of step S31 to step S36 depicted in FIG. 8, and therefore a description thereof is omitted.

Next, in step S67, the translation result analysis unit 23 analyzes the meaning of the source text.

Next, in step S68, the translation result analysis unit 23 analyzes the meaning of the reverse translated text.

Next, in step S69, the mistranslation determination unit 16b determines whether or not the meaning of the source text and the meaning of the reverse translated text are the same. Here, in a case where it has been determined that the meaning of the source text and the meaning of the reverse translated text are the same ("yes" in step S69), in step S70, the translation result transmission unit 24 transmits translation result information including the source text in the first language, the translated text in the second language, and the reverse translated text in the first language to the translation device 2.

Next, in step S71, the translation device 2 receives the translation result information transmitted by the server 1b.

Next, in step S72, the translation device 2 displays the source text, the translated text, and the reverse translated text on the basis of the translation result information received.

Furthermore, in step S73 which is performed in parallel with the processing by the translation device 2 for step S71 and step S72, the mistranslation determination unit 16b of the server 1b generates first parallel translation data that includes the source text and the translated text, and second parallel translation data that includes the reverse translated text and the translated text. The mistranslation determination unit 16b outputs the generated first parallel translation data and second parallel translation data to the parallel translation corpus registration unit 20a.

Next, in step S74, the parallel translation corpus registration unit 20a registers the first parallel translation data and the second parallel translation data generated by the mistranslation determination unit 16b, in the parallel translation corpus stored in the parallel translation corpus storage unit 19a.

In the present embodiment 3, the first parallel translation data in which the source text and the translated text that has been correctly translated are included as a pair, and the second parallel translation data in which the reverse translated text and the translated text are included as a pair are registered in the parallel translation corpus; however, it should be noted that the present disclosure is not particularly restricted thereto, and the first parallel translation data and the second parallel translation data may not be registered in the parallel translation corpus. In this case, if it is determined in step S69 that the meaning of the source text and the meaning of the reverse translated text are the same, the translation processing ends.

However, in a case where it has been determined that the meaning of the source text and the meaning of the reverse translated text are not the same ("no" in step S69), in step S75, the mistranslation determination unit 16b generates parallel translation data that includes the source text, the mistranslated text corresponding to the translated text, and the reverse translated text.

Next, in step S76, the mistranslation determination unit 16b stores the generated parallel translation data in the parallel translation data storage unit 22a.

It should be noted that the processing of step S77 to step S84 depicted in FIG. 13 is the same as the processing of step S49 to step S56 depicted in FIG. 9, and therefore a description thereof is omitted.

It should be noted that in the present embodiment 3 also, similar to the modified example of embodiment 1, the terminal device 3 may receive input of text that is similar to the source text as well as receiving revisions to the mistranslated text and the reverse translated text. In this case, each of the plurality of items of revised parallel translation data may include revised translated text, revised reverse translated text, and revised source text (text that is similar to the source text) which is text that is semantically the same as the source text but is expressed differently.

With a method, a translation system, and a program according to an aspect of the present disclosure, it is possible to collect a large amount of example text that includes source text and translated text as pairs, and it is also possible to prevent the generation of mistranslations.

What is claimed is:

1. A method executed in a translation system, the method including:
   (A) receiving source text by a translation device in a first language from a user, and transmitting the source text to a server over a network;
   (B) translating, by the server, the source text into a second language that is different from the first language to generate first translated text, and transmitting the first translated text to the translation device;
   (C) acquiring, by the translation device, a determination result as to whether or not the first translated text has been correctly translated from the user, and transmitting the determination result to the server;
   (D) in a case where the first translated text has not been correctly translated, generating, by the server, first parallel translation data that includes the source text and the first translated text that has not been correctly translated;
   (E) transmitting the first parallel translation data to a terminal device over the network;
   (F) receiving, by the server, from the terminal device, second translated text obtained by the source text being correctly translated by a translator into the second language; and
   (G) registering, into a parallel translation database, second parallel translation data that includes the source text and the second translated text.

2. The method according to claim 1, further including:
   (H) receiving, from the terminal device, a paraphrased text obtained by the source text being paraphrased into a different expression in the first language; and
   (I) registering, into the parallel translation database, third parallel translation data that includes the paraphrased text and the second translated text.

3. The method according to claim 1,
   wherein, in the (E), the first parallel translation data is transmitted to N terminal devices including the terminal device, where N is an integer of 2 or more, and
   the method further includes:
   (J) receiving, from the respective N terminal devices, N items of paraphrased text obtained by the source text being paraphrased into different expressions in the first language;
   (K) analyzing meanings of the N items of paraphrased text, and selecting, from among the N items of paraphrased text, a plurality of items of paraphrased text having identical meanings; and
   (L) in a case where a quantity of the plurality of items of paraphrased text is equal to or greater than a predetermined quantity, registering, into the parallel translation database, third parallel translation data that includes the second translated text and at least one selected from the plurality of items of paraphrased text.

4. The method according to claim 1,
wherein, the (C) includes:
   presenting the source text and the first translated text to the user; and
   receiving the determination result from the user.

5. The method according to claim 1,
wherein, the (C) includes:
   reverse-translating the first translated text into the first language to generate reverse-translated text;
   presenting the source text and the reverse-translated text to the user; and
   receiving the determination result from the user.

6. The method according to claim 5,
wherein the method further includes:
   (M) receiving, from the terminal device, revised text obtained by the reverse-translated text being revised to a correct expression in the first language; and
   in the (G), the second parallel translation data further includes the revised text.

7. The method according to claim 1,
wherein the (C) includes:
   reverse-translating the first translated text into the first language to generate reverse-translated text;
   analyzing a meaning of the source text;
   analyzing a meaning of the reverse-translated text; and
   generating the determination result by determining whether or not the meaning of the source text is the same as the meaning of the reverse translated text.

8. A computer included in the translation system, the computer comprising:
   a processor; and
   a memory storing a program for causing the processor to execute the method according to claim 1.

9. A non-transitory recording medium storing a program that causes the method according to claim 1 to be executed.

* * * * *